United States Patent [19]

Meijer et al.

[11] Patent Number: 5,610,268
[45] Date of Patent: Mar. 11, 1997

[54] DENDRITIC MACROMOLECULE AND THE PREPARATION THEREOF

[75] Inventors: Egbert W. Meijer, Waalre; Hubertus J. M. Bosman, Sittard; Franciscus H. A. M. J. Vandenbooren, Maastricht; Ellen M. M. De Brabander-Van Den Berg, Geleen; Anna M. C. F. Castelijns, Beek; Hendrikus C. J. De Man, Geleen; Rafael W. E. G. Reintjens, Nuth; Christiaan J. C. Stoelwinder; Atze J. Nijenhuis, both of Sittard, all of Netherlands

[73] Assignee: DSM N.V., Netherlands

[21] Appl. No.: 486,294

[22] Filed: Jun. 7, 1995

Related U.S. Application Data

[60] Division of Ser. No. 208,452, Mar. 10, 1994, which is a continuation-in-part of Ser. No. 117,004, filed as PCT/NL93/00008, Jan. 11, 1993, abandoned.

[30]    Foreign Application Priority Data

Jan. 13, 1992 [NL] Netherlands .......................... 9200043
Nov. 12, 1992 [EP] European Pat. Off. ............. 92203481

[51] Int. Cl.⁶ .......................... C08G 63/44; C08G 73/00
[52] U.S. Cl. .................... 528/363; 424/DIG. 16; 525/418
[58] Field of Search ................... 528/363; 424/DIG. 16; 525/418

[56]    References Cited

U.S. PATENT DOCUMENTS

| | | |
|---|---|---|
| 4,216,171 | 8/1980 | Soula et al. . |
| 4,289,872 | 9/1981 | Denkewalter et al. . |
| 4,410,688 | 10/1983 | Denkewalter et al. . |
| 4,507,466 | 3/1985 | Tomalia et al. . |
| 4,558,120 | 12/1985 | Tomalia et al. . |
| 4,568,737 | 2/1986 | Tomalia et al. . |
| 4,587,329 | 5/1986 | Tomalia et al. . |
| 4,599,400 | 7/1986 | Tomalia et al. . |
| 4,631,337 | 12/1986 | Tomalia et al. . |
| 4,690,985 | 9/1987 | Tomalia et al. . |
| 4,737,550 | 4/1988 | Tomalia et al. . |
| 4,845,297 | 7/1989 | Kumoi et al. . |

FOREIGN PATENT DOCUMENTS

| | | |
|---|---|---|
| 0002148 | 5/1979 | European Pat. Off. . |
| 0135725 | 4/1985 | European Pat. Off. . |
| 57967 | 11/1974 | Romania . |
| 68272 | 4/1979 | Romania . |
| 68153 | 7/1979 | Romania . |

OTHER PUBLICATIONS

Egon Buhleier, Winfried Wehner, Fritz Vogtle; Synthesis 1978, pp. 155–158.
Maciejewski, Concepts of Trapping Topologically by Shell Molecules, J. Macromol. Science Chemical, A17(4), pp. 689–703 (1982).
Tomalia et al., 'Starburst Dendrimers: Molecular–Level Control of Size, Shape, Surface Chemistry, Topology, and Flexibility from Atoms to Macroscopic Matter', Angew. Chem. Int. Ed. Engl. 29 (1990) pp. 138–175.

*Primary Examiner*—Joseph L. Schofer
*Assistant Examiner*—Wu C. Cheng
*Attorney, Agent, or Firm*—Cushman Darby & Cushman, L.L.P.

[57]    ABSTRACT

The invention relates to a dendritic macromolecule comprising a core and branches emanating from the core wherein the branches are based on vinyl cyanide and/or fumaryl dinatrile units. The invention also relates to processes for preparing these dendritic macromolecules. The dendritic macromolecules according to the invention are not sensitive to degradation through hydrolysis reactions and are also very stable at a high temperature. The processes are very suitable for large scale production of the dendritic macromolecules without requiring purification of reaction intermediates.

14 Claims, 1 Drawing Sheet

FIG. 1

DENDRITIC MACROMOLECULE AND THE PREPARATION THEREOF

RELATED APPLICATIONS

This is a division of application Ser. No. 08/208,452, filed Mar. 10, 1994 which is a continuation-in-part of our earlier U.S. application Ser. No. 08/117,004, filed as PCT/NL93/00008, Jan. 11, 1993, abandoned, the complete disclosure of which is incorporated herein by reference.

FIELD OF THE INVENTION

The present invention relates to a novel dendritic macromolecule comprising a core and branches emanating from the core, and to commercially useful processes for large-scale preparation of ultra-pure dendritic macromolecules.

BACKGROUND OF THE INVENTION

Dendritic macromolecules, sometimes referred to as dendrimers, are three-dimensional, highly ordered oligomeric and polymeric molecules with a very good defined chemical structure. Some dendritic macromolecules are known and are described, for example, in Angew. Chem. Int. Ed. Engl., 29: 138–175 (1990), the disclosure of which is incorporated herein by reference. This article describes a number of different dendritic macromolecules, for example polyamidoamine (PAMAM) dendrimers, which are also described in U.S. Pat. No. 4,507,466, and polyethyleneimine (PEI) dendrimers, which are also described in U.S. Pat. No. 4,631,337.

The applications envisaged for dendritic macromolecules are as diverse as they are numerous. The aforementioned publications mention several possible applications such as, for example, electronic applications, applications for the calibration of sieves, catalysts (and catalyst supports), selective membranes and coatings, but applications as impact modifiers or as cross-linking agents in several plastics could also be considered.

A drawback of the aforementioned dendritic macromolecules, however, is that PAMAM dendrimers are very sensitive to degradation through hydrolysis reactions. In particular, these dendrimers are not stable at an elevated temperature, which means that these macromolecules degrade significantly when they are exposed to higher temperatures.

The heretofore known procedures for preparing dendritic macromolecules also suffer from drawbacks. For instance, the two procedures described in Angew. Chem. Int. Ed. Engl. 29:138–175 (1990) are incapable of being scaled-up to provide commercially useful quantities of dendritic macromolecules. During one synthesis procedure, the so-called 'protected group method', the composition of the dendritic macromolecules, i.e., polyethyleneimine (PEI) dendrimers, is very accurately controlled via the strategic use of protected groups, which prevents undesired side reactions and undesired defects in the structure of the dendritic macromolecules. During the other synthesis procedure, the so-called 'excess reagent method', with which for example polyamidoamine (PAMAM) dendrimers are prepared, a very large excess of reagents is used to statistically minimize the risk of undesired reactions and defects.

The aforementioned 'protected group method' is based on the presence of protected aziridine rings. The aziridine rings are opened with the aid of primary amines, after which the deprotection is effected with the aid of a strong acid. The complex isolation procedures, the low yield of the synthesis procedure and the use of expensive reagents renders this method unsuitable for large-scale, e.g., commercially viable preparation of PEI dendrimers.

The aforementioned 'excess reagent method' includes, as a reaction step, the complete Michael addition reaction of primary amine groups to methyl methacrylate, followed by amidation using ethylenediamine. However, the synthesis of the polyamidoamine dendrimers thus formed requires a very large excess of reagents to prevent undesired side reactions. The greater part of the excess amount of reagents is removed through evaporation in, for example, a rotary evaporator, after which the last residual amounts of the reagents are removed from the viscous reaction product in a precipitation step. The intermediate product between the various synthesis steps must, however, be completely pure, which means that the precipitation step has to be repeated several times. These complicating factors render this synthesis procedure for dendritic macromolecules also unsuitable for large-scale application.

The drawbacks of each of the aforementioned synthesis procedures are so great that the use of these procedures on a large—and hence commercially attractive scale—involves insurmountable problems. "The main stumbling block to most of these applications is that large-scale synthetic methods remain to be developed." Science 251:1562–1564 (March 1991).

SUMMARY AND OBJECTS OF THE PRESENT INVENTION

A dendritic macromolecule according to the present invention comprises a core and branches radiating outwardly, emanating, from the core wherein the branches are prepared from vinyl-cyanide-based units. The dendritic macromolecules according to the present invention have very good thermal stability and are also very insensitive to degradation through hydrolysis reactions. In addition, a dendritic macromolecule according to the present invention has a very compact structure.

The present processes can be scaled-up to produce a dendrimer on a commercial-scale, A process for preparing these dendritic macromolecules comprises (1) allowing at least the functional group of the core molecule to react with a vinyl cyanide unit to obtain incorporated nitrile units, e.g., cyanide-terminated reaction products; (2) reducing the incorporated nitrile units to amine groups; and (3) if desired, reacting in reiterative fashion the amine groups with further vinyl-cyanide units to prepare the succeeding generation in the branches emanating from the core. Carrying out the second and third steps, reiteratively and alternately, for N−1 times will result in a dendritic macromolecule having branches of the desired generation "N".

In an embodiment, a diamine, for instance 1,4-diaminobutane, is dissolved in an alcohol, such as methanol, after which a vinyl cyanide, for instance acrylonitrile, is added. When the Michael addition reaction between the diamine and vinyl cyanide compound has taken place, the excess of vinyl cyanide is distilled off, to yield a cyanide-terminated reaction product. Next, this cyanide-terminated reaction product is reduced by means of hydrogen, e.g., in water. Evaporating the water yields an amine-terminated reaction product. The two reactions are carried out in a reiterative fashion, i.e. repetitively but alternately, so that a dendritic macromolecule of the desired generation is obtained.

The present processes for the preparation of dendritic macromolecules do not suffer the drawbacks noted with the heretofore known processes.

The present processes permit the preparation of the desired dendritic macromolecule in high yields and with high selectivity.

The present processes for preparing the desired dendritic macromolecules do not require high catalyst concentration in a hydrogenation step.

In the present processes, one solvent can be used for all reactions whereby the synthesis of the present dendritic macromolecules can be conducted without the need to isolate each of the individual intermediates.

The present processes provide for versatility of the synthesis strategy which allows for introduction of a wide variety of end groups and core-groups.

DETAILED DESCRIPTION OF THE INVENTION

Figure 1:
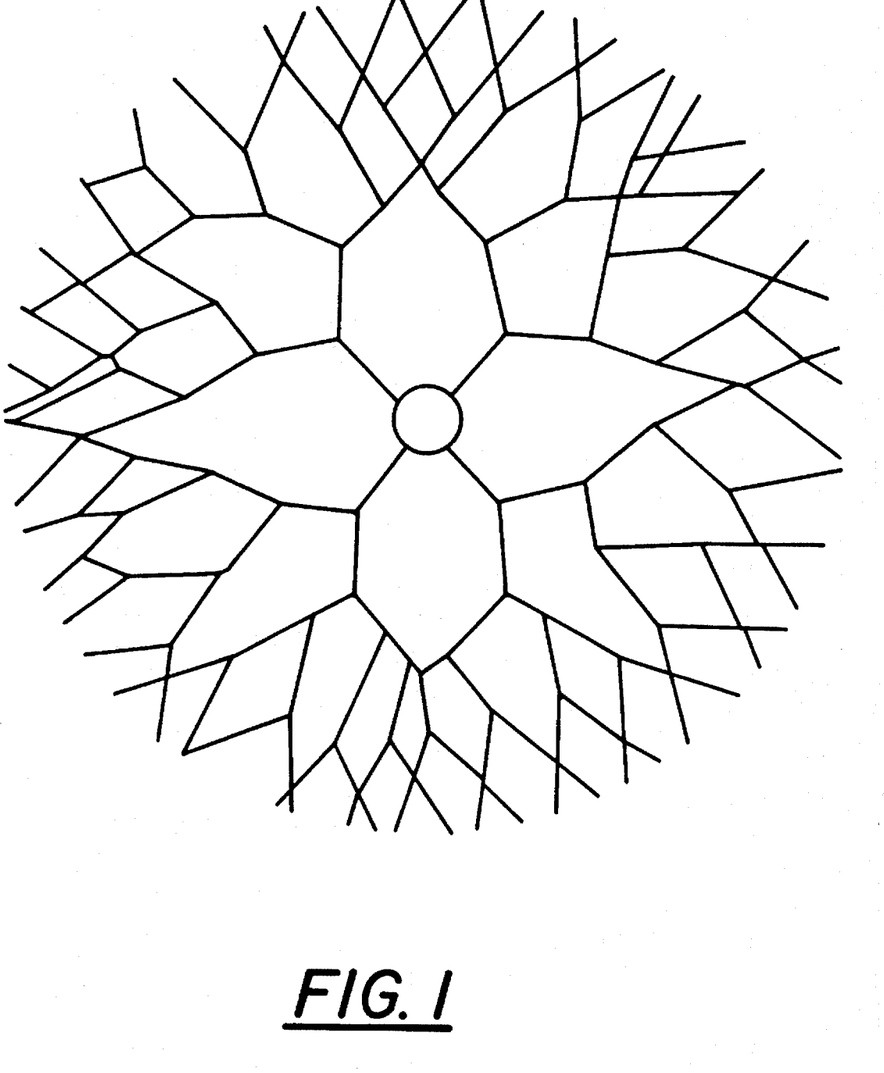
FIG. 1 is a two-dimensional projection of an example of a dendritic macromolecule.

A dendritic macromolecule, also known as a dendrimer or a stellar dendrite, is a three-dimensional, highly ordered oligomeric and polymeric molecule having a well-defined chemical structure. These macromolecules are formed by carrying out alternate reaction steps, i.e., reiterative reaction sequences, starting from a core or an initiator core. Usually the reactions occurring during the synthesis are virtually complete and selective reactions, which means that no or virtually no undesired side-reactions take place and a dendritic macromolecule is obtained that has a well defined chemical structure.

According to the present invention, the molecules that can be used as a core contain at least one functional group. Within the framework of the present invention, a functional group is a group that can react with a branch-forming unit based on vinyl-cyanide containing compounds. The reaction with vinyl cyanide groups can, if desired, be conducted in the presence of a suitable catalyst. Illustrative of the functional groups (sometimes referred to herein as "G") which, under favorable reaction conditions can react with a branch-forming unit having reactive vinyl-cyanide groups (hereinafter sometime referred to as "vinyl cyanide unit"), are, for example, hydroxyl groups, primary and secondary amine groups, thiol groups, carbon compounds with electronegative substituents, such as ester groups, amide groups, ketone groups, aldehyde groups, carboxylic acid groups and salts thereof. By preference, the core contains a hydroxyl group, a primary amine group and/or a secondary amine group.

A functional group in the core group can react with one or several vinyl-cyanide units. The actual reaction depends on the nature of the functional group. Thus, if a functional group G can react with F number of vinyl-cyanide units, that functional group has a functionality F. For instance, a hydroxyl group can react with one vinyl-cyanide unit and hence has a functionality, F, of 1. A primary amine group can react with two vinyl-cyanide units and hence has a functionality, F, of 2. In general, the functionality F has a value of 1, 2 or 3.

A core can be based on a molecule or polymer that contains at least one functional group G. By preference, a molecule suitable for a core of a dendritic macromolecule according to the present invention contains 1 to 10 functional groups G. Illustrative of such suitable molecules, in one embodiment of the present invention, are, among others, ammonia, water, methanol, polymethylenediamines, diethylenetriamine, triethylenetetramine, tetraethylenepentamine, linear and branched polyethylene imine, methylamine, hydroxyethylamine, octadecylamine, polyaminoalkylarenes, such as 1,3,5-tris(aminomethyl)benzene, tris(aminoalkyl)amines, such as tris(aminoethyl)amine, heterocyclic amines, such as imidazolines and piperidines, hydroxyethylaminoethylamine, mercaptoethyl amine, morpholine, piperazine, pentaerythritol, sorbitol, mannitol, duleitol, inositol, polyalkylenepolyols, such as polyethylene glycol and polypropylene glycol, glycols, such as ethylene glycol, 1,2-dimercaptoethane, polyalkylene polymercaptans, phosphine, $\epsilon$-aminocaproic acid, glycine, thiophenols, phenols, melamine and derivatives thereof, such as melamine tris(hexamethylenediamine). In one process embodiment according to the present invention, a core is preferably based on a compound from the class of polymethylene diamines or glycols, although tris(1,3,5-aminomethyl)benzene is also useful. Among the suitable polymethylenediamines are hexamethylenediamine, ethylenediamine and 1,4-diaminobutane (DAB). By preference, 1,4-diaminobutane is the molecule used in forming the core.

According to one embodiment of the invention, the molecular weight of the dendritic macromolecules is 100 to 1,000,000, preferably 700 to 100,000, and, in particular is 1600 to 100,000.

According to another embodiment of the invention, a (co)polymer containing at least one of the functional groups (G) can serve as a (co)polymer core for the dendritic macromolecule.

Examples of such (co)polymers include styrene-maleimide copolymer, styrene-acrylonitrile copolymer, polyethyleneimine and polymers such as polypropylene oxide, polystyrene and ethylene-propylene-diene copolymers that are functionalized with one or more of the above functional groups, such as $NH_2$ groups. In general, the core has a functionality "F" of at least 1, and the functionality can range, for instance from 2 to 100.

According to a preferred embodiment of the invention, the molecular weight of the dendritic macromolecule is greater than 800, and, in particular, is greater than 1500. The molecular weight can be less than 100,000, and, in particular, can be less than 50,000.

According to a further embodiment of the invention, dendrimers of a low generation, for instance the first, second or third generation, described in U.S. Pat. No. 4,507,466 or a first or second generation as described in Buhleier, "Cascade" and "Non-Skid-Chain-Like" Synthesis of Molecular Cavity Topologies, *Synthesis*, 155–158 (February 1978), the disclosures of which are incorporated herein by reference, are used as a core of a dendritic macromolecule according to the present invention. Particularly in this case the functionality of the core molecule can be very high. For instance, 10 to 40 amine groups can be present. The molecular weight of such core molecules is, in general, greater than 200 and less than 5,000.

The shape of the core which is selected largely determines the three-dimensional shape of the dendritic macromolecule. For instance, if a small molecule is used as a core, a dendritic macromolecule with a spherical shape can be obtained.

However, if a polymer is used as a core, the dendritic macromolecule obtained will tend to have a more longitudinal shape.

A number of branches are prepared from vinyl-cyanide units and emanate from the core. The branches are formed using the reiterative reaction sequences as described herein.

The theoretical total number of branches of the desired generation N can be calculated as follows. If G represents the number of functional groups that the core contains and F represents the functionality of each individual functional group, then the number of reactive sites R of the core equals the sum of the functionalities F of all of the functional groups G. The maximum number of branches of the $N^{th}$ generation can be described as the number of reactive sites R multiplied by $F^{N-1}$ e.g. $R \times (F^{N-1})$. If the reactions that take place remain incomplete then the number of branches will be smaller, i.e. between R and $(R) \times (F^{N-1})$. Usually the dendritic macromolecule contains 1–10 generations of branches, preferably 2–10, and, in particular, 3–9.

Branch-forming vinyl-cyanide units that are suitable in the present invention contain a double bond and also an electron-withdrawing group directly conjugated to the double bond. Vinyl-cyanide units can be selected from the class of compounds represented by formula 1:

(formula 1)

wherein $R^1$ represents —H or —$CH_3$;

$R^2$ represents —H, —$CH_3$ or —C≡N;

A represents —C≡N;

and $R^3$ represents a hydrocarbon compound having 1 to 18 carbon atoms and containing 1 to 5 cyanide groups.

More particularly, the vinyl-cyanide units can be selected from the class of compounds represented by formula 1a, (formula 1a)

wherein

$R^1$ represents —H or —$CH_3$; and

A represents —C≡N

One or more branches may be based on fumaryl dinitrile and derivatives thereof. Thus, in addition to acrylonitrile, and its nitrile derivatives, fumaryl dinitrile can be used in generating the branches. Other polynitriles, such as fumaryl derivatives, can be used to increase branching within a branch of the dendrimer macromolecule.

Particularly, suitable useful vinyl-cyanide units are acrylonitrile and methacrylonitrile (MACN).

The dendritic macromolecule comprises a core, as above-described, and branches emanating therefrom. Among the branches of the dendritic macromolecule, there are at least four units of formula 2:

(formula 2)

wherein

R represents H or —C≡N;

$R^1$ represents the core or the core plus vinyl cyanide unit(s) of the previous generation(s);

$R^2$ represents —H or —$CH_3$; and $R^3$ represents wherein $R^5$ represents —H or a unit of the next generation,

$R^6$ represents —H or a unit of the next generation, provided that the

$R^5$ and $R^6$ in each may be the same or different from one another.

To further illustrate the present invention in the context of formula 2, the following is presented wherein $R^1$ represents, for instance, a 1,4-diamino butane residue and $R^2$ represents H.

generation no. 2

H₂/catalyst
(Raney Cobalt)

In the foregoing illustration, in generation 2, $R^3$ represents and
$R^5$ and $R^6$ each represent $CH_2$—$CH_2$—C≡N. In generation 2.5, $R^3$ represents and
$R^5$ and $R^6$ each represent —$CH_2$—$CH_2$—$CH_2$—$NH_2$.

In the context of formula 2, the Michael addition can be performed with fumaryl dinitrile. In this example, a core-former, 1,4-diamino butane is allowed to react with fumaryl dinitrile to yield wherein in formula 2 $R^5$ is H and $R^6$ represents This product is then allowed to react with acrylonitrile (ACN) to yield a nitrile-terminated product (shown in a relevant part):

which nitrile-terminated product is then reduced with hydrogen in the presence of a suitable catalyst, such as Raney Cobalt to yield a product (shown in a relevant part):

Among the branches in a dendritic molecule, there are usually fewer than 1000, preferably fewer than 250, units represented by formula 2. The branches preferably comprise more than 6, in particular more than 10 units of formula 2. Optionally, the branches of the dendritic macromolecules can contain different units of formula 2.

The present processes for preparing dendritic macromolecules are amenable to being scaled-up to a large scale. In these processes, it is useful to separate the catalyst from the reaction mixture after completion of the reduction reaction. However, it is not necessary to each time purify the product obtained in an individual intermediate step, except to remove solvent and catalyst.

According to one embodiment of the present invention, a process for preparing the dendritic macromolecule comprises (a) reacting every functional group of the core with a vinyl-cyanide unit to obtain incorporated nitrile units; (b) reducing every incorporated nitrile unit to an amine group; (c) reacting the amine groups with vinyl-cyanide units; wherein steps (b) and (c) are carried out alternately and reiteratively (N–1) times to extend the branches emanating from the core whereby a dendritic macromolecule having branches of the desired generation N is obtained. The value of N usually varies from 1 to 10. By preference, N has a value of 3–10. The process can be interrupted or stopped after reaction step (b) to obtain a dendritic macromolecule of generation 1.5, 2.5 or higher.

According to another embodiment, a process for the preparation of a dendritic macromolecule containing a core and at least one branch emanating from the core comprises dissolving a quantity of a core molecule having at least one functional group in a suitable solvent, after which an addition reaction and a hydrogenation reaction are alternately and reiteratively carried out, wherein during the addition reaction vinyl cyanide units are added to the solution and react with at least one functional group in the core molecule, and during the hydrogenation reaction the cyanide groups of the dendritic macromolecule are reduced, in solution, by means of hydrogen and a suitable catalyst whereby functional amine groups are formed. This embodiment is further described as a process for preparing the dendritic macromolecule which comprises (a) reacting substantially every functional group of the core with a vinyl-cyanide unit whereby nitrile groups are incorporated; (b) reducing substantially every incorporated nitrile unit to an amine group; and (c) reacting substantially every amine group with vinyl-cyanide units. As contemplated herein with respect to this embodiment, substantially usually means at least 80%. By preference, substantially means at least 90%, more preferably at least 95%, and most preferably at least 99%. Steps (b) and (c) can be alternately and reiteratively carried out (N–1) times to extend the branches emanating from the core molecule whereby a dendritic macromolecule having branches of the desired generation N is obviated. The value of N can be in the range to 1 to 10, but preferably is in the range of 3 to 10.

An embodiment according to the present invention can be illustrated with reference to the following reaction scheme:

The foregoing is illustrative of an embodiment of the present invention, and shows that a dendritic macromolecule according to the present invention can be produced on a large scale in a simple way. Further details concerning the present invention are as follows.

Step (a) The Vinyl-Cyanide Reaction

In step a) of the processes according to the present invention, the functional groups, or at least a substantial number thereof, in the core are allowed to react with vinyl-cyanide units. A core having functionality F may react with F number of vinyl-cyanide units. The ensuing reaction, such as, for example, the Michael addition of a primary amine group to a vinyl-cyanide unit, usually takes place in solution. It is important that the solvent does not react with the functional groups of the core under the reaction conditions used. Accordingly, an inert solvent is usually selected so that the course of the ensuing desired reaction is unaffected, and the occurrence of undesired side reactions is avoided. Suitable such solvents can be selected, for example, from, among others, water, tetrahydrofuran, various alcohols, such as methanol, ethanol, isopropanol and the like, various ethers, and mixtures of these solvents. The solvent selection will depend greatly on the nature of the functional groups of the core. Preferably the solvent is water, methanol, or a mixture thereof, although water is the most preferred solvent.

Every reactive site of the core can, if desired, be allowed to react with a vinyl-cyanide unit during this reaction step provided that the molar ratio of the reagents, which can be described as the ratio of the number of vinyl-cyanide units to the number of reactive sites, is at least 1. Usually this ratio is between 1 and 5, and more preferably is between 1 and 2.5. If this ratio is less than 1 then not every reactive site will react with a vinyl-cyanide unit.

The vinyl cyanide can either be added slowly to a solution of the substrate in the solvent, with mild cooling, or in one shot, i.e. a single rapid addition, without the necessity of cooling the reaction mixture.

In the present processes, the Michael condensation of, for instance, an amine group with a vinyl-cyanide unit, can be performed under different temperature conditions such as, either at a mild temperature of, for instance, 40° C., or at a higher temperature. In one embodiment, the temperature during the Michael condensation is usually between 0° C. and 100° C., preferably between 5° and 70° C. In another embodiment, the Michael addition is performed at a higher temperature such as, between 60° and 100° C., but preferably between 70° and 90° C. Surprisingly, it was found that by applying a higher temperature, the reaction time can be reduced considerably, while simultaneously enhancing the selectivity of the Michael addition reaction.

The Michael addition generally results in virtually complete conversion in less than (0.5)(m) hours, wherein m represents the number of reactive sites on the core molecule. In particular, virtually complete conversion is achieved within less than (0.25)(m) hours. The reaction time of the Michael addition is generally longer than 0.5 hour. According to the present invention, the time within which virtually full conversion is achieved decreases with increasing vinyl cyanide concentration, and, in general, is shorter than 8 hours or shorter than 5 hours.

If desired, a catalyst can be added to the reaction mixture during step a) to insure that the reaction of a functional group with the vinyl-cyanide units proceeds well. Examples of suitable catalysts include weak acids such as, for example, acetic acid, or (weak) bases. Usually the amount of catalyst that is added to the reaction mixture is above 0 to about 5 mol. %, relative to the number of reactive sites R.

In general the cyanide-terminated reaction product of the Michael addition can be collected or isolated in a simple manner such as, for instance, by distilling off the excess of nitrile and part of the solvent and subsequently effecting a phase separation between, on the one hand, the rest of the solvent which contains a minor quantity of nitrile and, on the other hand, the dendrimer precursor (cyanide-terminated reaction product) which contains some water. To that end, first the excess of nitrile is distilled off at a temperature preferably lower than 80° C. The reaction mixture is cooled to a temperature between room temperature and 60° C. to achieve an optimum phase separation. The mixture is preferably cooled to a temperature between room temperature and 45° C. The essentially dendrimer-free solvent layer contains any by-products and unreacted vinyl cyanide and can be re-used in a subsequent Michael condensation reaction.

The cyanide-terminated reaction product is sufficiently pure that, in general, further purification is unnecessary. If desired, a simple additional purification step such as, for instance, recrystallization, can be performed. In general, in the processes according to the invention, the cyanide-terminated reaction product is obtained with a selectivity greater than 99%. The selectivity per conversion is preferably at least 99.5%.

Step (b): The Reduction (Hydrogenation)

The virtually complete reduction, e.g., hydrogenation, of nitrile groups in dendrimers with more than 8, in particular more than 10 nitrile groups, appears not to be possible with the heretofore known but arbitrarily and randomly selected hydrogenation techniques.

The processes according to the invention are particularly suitable for the hydrogenation of nitriles in dendritic macromolecules with more than 10, in particular more than 15 nitrile groups.

All, or substantially all, of the incorporated vinyl-cyanide units are reduced to an amine group, preferably a primary amine group in the reduction step. For instance, if the incorporated vinyl-cyanide unit is based on acrylonitrile, the unit is reduced to a propylamine (PA) unit. The reduction reaction usually takes place in solution.

The solvent used in the reduction step, e.g., hydrogeneration step, is generally selected from a solvent class which includes diamines such as alkanediamines (such as ethylenediamine or 1,3-diaminopropane, 1,4-diaminobutane, 1,6-diaminobutane) water, ammonia, various alcohols, such as methanol, ethanol, isopropanol and the like, various ethers, such as tetrahydrofuran and dioxane, and mixtures of these solvents. Advantageously, the solvent is water, methanol, ethylenediamine, 1,3-aminopropane, 1,4-diaminobutane, 1,6-diaminobutane or a mixture thereof.

In a preferred embodiment, the solvent used in the hydrogenation step is an alcohol, which contains ammonia, wherein the amount of ammonia is such that the molar ratio between ammonia and the number of cyanide groups is greater than 0.8. Minimal poisoning of the catalyst used in the hydrogenation reaction is achieved if the molar ratio between ammonia and the number of cyanide groups is less than 50. In general, a molar ratio between ammonia and the number of cyanide groups of less than 20 results in good selectivity during the hydrogenation. In general, a large portion of the ammonia will be present in the gas phase. Only a fraction of the ammonia dissolves in the alcohol. For instance, the reaction can be conducted in an alcohol solvent under an ammonia-containing atmosphere, at a desired ammonia partial pressure, whereby the desired amount of ammonia dissolves in the solvent.

Suitable alcohols have low-boiling points and include such as methanol, ethanol, isopropanol and the like. The alcohol preferably is methanol. A mixture of different alcohols can also be used. A mixture of one or more alcohols and water can also be used. The water to alcohol weight ratio is generally between 1:50 and 2:1. The water:alcohol weight ratio is preferably between 1:10 and 1:1.

Surprisingly, it has been found that with the hydrogenation according to the invention the selectivity of a subsequent Michael addition reaction is also increased from about 95% to 99.5% or higher.

The reduction reaction can be effected by causing the incorporated vinyl-cyanide units to react with $H_2$ gas. If complete reduction is desired, the molar ratio of $H_2$/nitrile groups must be at least 2. If the molar is ratio is less than 2 complete reduction will not take place.

The reduction step is usually carried out in the presence of a catalyst. In general, a hydrogenation catalyst, preferably a heterogeneous catalyst, is used. Useful catalysts include metal-based catalysts which comprise a metal from Group VIII of the periodic system of the elements as shown in the cover of the Handbook of Chemistry and Physics, 58th edition, CRC Press, 1977–1978. Metals from Group VIII are catalytically active in the hydrogenation of nitriles as described, for example, in EP-A-0077911, the disclosure of which is incorporated by reference. Particularly suitable metals include, among others, nickel, cobalt, platinum, palladium and rhodium. In order to possess sufficient catalytic activity, the metal must be present in a form that has a large active surface area. The metal may be used as such or it may be applied on a suitable carrier.

A particularly suitable catalyst is Raney nickel or Raney cobalt. These Raney catalysts and their preparation are described in U.S. Pat. No. 1,628,190, the disclosure of which is incorporated by reference. Raney nickel comprises mainly nickel and aluminum, the latter being in the form of metallic aluminum, aluminum oxides or aluminum hydroxides. Small amounts of other metals, such as iron and/or chromium, in elemental or bound form, may be added to the Raney nickel to increase its activity and selectivity in the hydrogenation of particular groups of compounds. It is known that Raney nickel promoted with iron and/or chromium is extremely suitable for the reduction of nitrile groups as described, for example, in S. R. Montgomery, Catalysis of Organic Reactions, 5, pp. 383–409 (1981), the disclosure of which is incorporated by reference. Raney cobalt also contains aluminum and may be provided with promoters. For example, Raney cobalt promoted with chromium is very suitable for the hydrogenation of nitriles.

Before use, the Raney nickel or Raney cobalt catalyst can be pretreated with an alkaline solution, for example, KOH or NaOH, to favorably influence the selectivity of the reduction reaction. The amount of hydroxide to be used for this purpose depends on the amount of catalyst. In general, between 0.01 and 0.2 gram of hydroxide per gram of catalyst (dry weight) is used. Preferably, between 0.03 and 0.18 gram of hydroxide per gram of catalyst is used, although most preferably of between 0.05 and 0.15 gram of hydroxide per gram of catalyst. The catalyst pretreatment is carried out by dissolving the desired amount of hydroxide in the smallest possible amount of suitable solvent, for example water, after which the solution obtained is added to the catalyst which has been rinsed with water beforehand. The mixture thus obtained is intensively stirred.

Optionally, the catalyst can be washed, for instance, with the solvent of the hydrogenation reaction, with an alcohol, with a mixture of different alcohols or a mixture of water and one or more alcohols. Suitable alcohols are, for instance, methanol, ethanol, isopropanol and the like.

Homogeneous metal-containing catalysts can, if desired, be advantageously employed in the hydrogenation of nitriles to amine moieties. Useful catalysts include complexes of metals from Group 8 of the Periodic System of Elements, and particularly suitable metals include, among others, iron, cobalt, nickel, rhodium and ruthenium. Exemplary catalysts include $K_2[(Ph_3)P)_2Ph_2P—C_6H_4RuH_2]C_{10}H_8 \cdot Et_2O$, $[HRh(P(i—Pr)_3)_3]$, $Fe(CO)_5$, $Ni(CO)_4$, and $Co_2(CO)_8$.

A non-metal based catalyst can if desired, be employed in the reduction (hydrogenation) of nitrile functionalities in this step of the present process. The reduction of nitrile-terminated dendrimers to amine-terminated dendrimers can also be accomplished using chemical reducing agents, such as aluminum reagents e.g., $LiAlH_4$, borane reagents such as borane-tetrahydrofurane ($BH_3 \cdot THF$) and borane-dimethyl-sulfide, and NaOEt. It is also possible to use $NaBH_4$ as reducing agent, especially when $CoCl_2$ is added as a promotor. The reduction of nitriles to amines is described in March, *Advanced Organic Chemistry*, 815 (3d 1985) and references cited therein, the complete disclosures of which are incorporated herein by reference. A borane-dimethyl sulfide reduction of nitriles is described in Brown et al., Improved Procedure for Borane-Dimethyl Sulfide Reduction of Nitrites, *Synthesis*, 605 (1981) and references cited therein, the complete disclosures of which are incorporated herein by reference.

The maximum amount of catalyst that can be used in the hydrogenation reactor depends on the type of reactor used. One skilled in the art can readily determine a suitable quantity of catalyst for given a given reactor.

In an embodiment of the process according to the present invention the concentration of the catalyst, relative to the total weight of the reaction mixture, is usually between 1 and 35 wt. %, preferably between 5 and 20 wt. %, most preferably between 6 and 12 wt. %.

In a further embodiment of the process according to the present invention, the amount of catalyst required increases with increasing dendrimer generation. The weight ratio of the required weight of catalyst (dry) relative to the dendritic macromolecule weight is usually larger than 10%. In general the weight ratio of the required weight of catalyst relative to the dendritic macromolecule weight is less than 3*n%, n being the theoretical number of cyanide groups of the cyanide-terminated dendritic macromolecule to be hydrogenated. The required weight of catalyst (dry) relative to the weight of the cyanide-terminated dendritic macromolecule is preferably larger than 12% and smaller than 50%.

The amount of cyanide-terminated product that can be used in the hydrogenation reaction according to an embodiment of the invention is at least 10 wt. %, preferably at least 20 wt. %, relative to the total weight of the reaction mixture.

The hydrogenation reaction in reduction step (b) can be conducted in, for example, a sealed reactor under a $H_2$ atmosphere. The total pressure prevailing in the reactor is primarily attributable to the combined partial pressures of the hydrogen and the ammonia at a given reactor temperature. The hydrogen pressure in this sealed reactor is usually between 1 and 500 bar, is preferably between 10 and 200 bar, and is most preferably between 10 and 100 bar. The hydrogen pressure prevailing in the reactor is usually higher than 1 bar, preferably higher than 10 bar. The reaction temperature is not critical. According to one embodiment, the temperature is between 0° C. and 200° C., preferably between above 10° C. and about 100° C. According to a further embodiment, the temperature is generally between above 0° C. and about 200° C., preferably between 10° C. and 150° C., and more preferably 50° and 110° C.

The reduction step in the process according to the present invention offers the advantage that no foaming occurs during the reduction (hydrogenation) reaction, and none upon opening of the reactor, after completion of the hydrogenation reaction.

The catalyst can be removed from the reaction mixture when the hydrogenation reaction is completed. This can be effected for instance by cooling the reactor under a $H_2$ atmosphere and, after the $H_2$ has been discharged, purging the reactor with inert gas and filtering off the reactor contents. The filtrate contains a dendrimer in solution.

A so-called 'filter candle' (a filter made of sintered metal) can, if desired, be mounted in the reactor. The filtrate is then removed from the reactor via the inner space of the filter, while the catalyst remains on the outside of the filter in the reactor. Advantageously, the reactor can be kept under pressure while carrying out several hydrogenation reactions successively and avoiding hydrogen deficiency of the catalyst.

A regenerated hydrogenation catalyst can be used in the process according to the present invention. A regenerated catalyst can be obtained by treating a used or spent catalyst with a caustic solution for several hours. For instance, a used or spent catalyst can be treated with an aqueous NaOH solution, at a temperature between 50° C. and 70° C. After filtering off the caustic solution, the catalyst is subsequently washed with demineralized water until the pH of the washing water is approximately neutral. The thus formed regenerated catalyst is stored under water.

Step (c): Reacting The Reduction Product with Vinyl Cyanide Units

In step c) of the processes according to the present invention, the functional groups (or at least substantially all of) are allowed to react with vinyl-cyanide units (Michael addition reaction). If the functional group is a primary amine group, it can react with two vinyl-cyanide units. The reaction conditions during this reaction step can be selected to match those prevailing during reaction step a).

A second-generation (N=2) dendritic macromolecule is obtained, for instance, when reaction steps a) through c) are carried out once. A higher-generation dendritic macromolecule can be obtained by alternately repeating reaction steps b) and c), i.e. carrying out the reaction sequences in an alternative and reiterative fashion. If reaction steps b) and c) are carried out alternately N times a $(N+1)^{th}$ generation dendritic macromolecule is obtained. If so desired, the reaction product can be isolated after reaction step b) to obtain a dendritic macromolecule of a generation 1.5, 2.5 or higher. The reaction product obtained can be isolated after any reaction step.

Modified Dendritic Molecules

The dendritic macromolecule can, if desired, be wholly or partially modified with a variety of functional groups. Modification can be effected, for instance, by allowing the available amine or nitrile groups, optionally in the presence of a suitable catalyst, to react wholly or partially with suitable reagents. Examples of such reagents are described in our co-pending application Ser. No. 08/117,004, filed Sep. 13, 1993, the complete disclosure of which is incorporated by reference.

Illustrative of the suitable reagents are α,β-unsaturated compounds substituted with electron-withdrawing groups including unsaturated aliphatic esters and amides such as, for instance, ethylacrylate, butylacrylate, 2-ethylhexylacrylate, 2-hydroxyethylacrylate, 2-hydroxypropylacrylate, acrylic ester, methacrylic ester, crotylic ester dimethyl ester of fumaric acid, methaacrylamide and acrylamide; polyamides such as, for instance, nylon 4,6, nylon 6, nylon 6,10, nylon 8, epoxies such as, for instance, ethylene oxide and propylene oxide; acid halides such as, for instance, acid chlorides, acryloyl chloride, benzoic acid-chloride, acetic acid-chloride, and stearic acid-chloride; alkyl halides such as, for instance, epichlorohydrine, ethyl bromoacetate, propyl bromide and allyl bromide; aryl halides such as, for instance, benzyl chloride; tosyl halides such as, for instance, tosyl chloride; arthydrides, such as, for instance, maleic anhydride, acetic anhydride, succinic anhydride and phthalic anhydride; dicarboxylic acids such as, for instance, terephthalic acid and adipic acid; diols; (a) cyclic aldehydes such as, for instance, formaldehyde, acetaldehyde, hexanal, benzaldehyde, pyridine aldehydes, p-formyl phenyl acetic acid and 1,4,5,8-naphthalene tetraacetaldehyde; ketones such as, for instance, derivatized cyclohexanones (e.g., HALS compounds); lactide; lactones such as, for instance, caprolactone; phosphate esters such as are described, for instance, in U.S. Pat. No. 3,855,364, the disclosure of which is incorporated herein by reference; and molecules with a chiral center.

This enumeration is merely illustrative, and not exhaustive.

The resulting dendritic macromolecules have chain-ends, that are entirely or partly modified with functional groups. These functional groups are for example, selected from among of amine, nitrile, hydroxide, ester, acid, salt, amide, imide, tosylate and thiol groups. A mixture of several different functional groups can be used, if required.

Other useful compositions comprise blends or mixtures of a thermoplastic polymer or other polymer composition with a dendritic macromolecule of the present invention. The dendritic macromolecules according to the present invention can be easily, readily and thoroughly mixed with a thermoplastic polymer or a polymer composition. The efficacious use of the dendritic macromolecule of the present invention in such compositions results, at least in part, from their good thermal stability and limited sensitivity to water.

A thermoplastic polymer in the blend can be selected, for example, from a number of polymers which, for illustrative purposes, includes polyolefins, such as polyethylene and polypropylene, polyesters, such as polyalkylene terephthalates (such as polyethylene terephthalate and polybutylene terephthalate) and polycarbonates, polyamides, such as nylon 6, nylon 4.6, nylon 8, nylon 6.10 and the like, polystyrene, polyoxymethylene, acrylonitrile-butadiene-styrene copolymers, styrene-acrylonitrile copolymers, styrene-maleimide copolymers, polysulphonic acid, polyimides, styrene-maleic anhydride copolymers, poly(methyl methacrylate), poly(vinyl alcohol), or polymer compositions of several of these polymers. The listed polymers are by no means exhaustive.

Optionally, additives may be added to a mixture of dendritic macromolecules according to the invention and a thermoplastic polymer or a polymer composition. Examples of such additives include, among others, impact modifiers, stabilizers, antioxidants, lubricants, fillers, flame retardants, colorants, pigments, reinforcing fibres and conductive fibres.

Dendritic macromolecules are described in Netherlands application 9200043 filed Jan. 13, 1992, PCT Int'l Application PCT/NL93/00008 filed Jan. 11, 1993, European application 92203481, filed Nov. 12, 1993, European application 93902579, filed Jan. 11, 1993, Belgium application 9300702, filed Jul. 8, 1993, Belgium application 9400100, filed Jan. 28, 1994, *Angew. Chem.*, 105:1370 (1993), and de Brabander-van den Berg, et al. Large-Scale Production of Polypropylenimine Dendrimers, ACS National Meeting, Denver, Colo. (Mar. 28, 1993), the complete disclosures of each of the foregoing is incorporated herein by reference.

The dendritic macromolecules according to the present invention are useful in coatings, adhesives, plastic additives, lubricants, cosmetics, catalysts, conductive plastics, agricultural chemicals, and pharmaceutical or medicinal uses, and in the latter regard reference is made to Peppas et al., Dendrimers and Star Polymers for Pharmaceutical and Medicinal Applications, *Proceed. Intern. Symp. Control. Rel. Bioact. Mater.*, 20:143 (Jul. 27, 1993).

The invention will be further elucidated with reference to the following non-limiting examples.

EXAMPLES

In the Examples, various abbreviations are used. DAB means 1,4-diaminobutane. ACN means acrylonitrile. EDA means ethylenediamine. PA means propylamine. ETAM means ethanolamine. PEG means polyethylene glycol. ε-AC means ε-aminocaproic acid. THF means tetrahydrofuran. MEL(HMA)$_3$ means melamine (1,3,5-trihexamethyleneamine). EAC means ethylacrylate. EA means ethanolamine. HA means hydromethyl acrylamide. FCN$_2$ means fumaryl dinitrile.

In Examples XIV, XVIII, and XIX, the selectivity of the reduction of C≡N to —CH$_2$ —NH$_2$ groups is high, i.e. >99.5%.

Example I 1200 ml of methanol and 150 g (1.7 mol) of 1,4-diaminobutane (DAB, substrate) were introduced into a 2-liter three-necked flask equipped with a stirrer, a cooler, a thermometer and a dropping funnel. This mixture was cooled to a temperature of 10° C. Then a solution of 400 g (7.6 mol) of acrylonitrile (ACN) in 100 ml of methanol was added dropwise to the cooled DAB-containing solution over a period of two hours. Then the reaction mixture thus obtained was heated for 16 hours (temperature 40° C.).

After the mixture had subsequently cooled to room temperature, both the methanol and the excess acrylonitrile were evaporated under reduced pressure. The residue thus obtained was dissolved in methanol at a temperature of 50° C., after which, after crystallization and isolation, the desired product, i.e., the desired tetranitrile, was obtained in a pure form, as white needles; the product was found to have a melting point of 52.8° C. The yield was 92%.

Analysis of the isolated product by means of $^1$H and $^{13}$C NMR spectroscopy and mass spectrometry showed that the product obtained was DAB(ACN)$_4$.

$^{13}$C NMR (50 MHz, D$_2$O): 119 ppm, CN; 53.1 ppm, N CH$_2$ (CH$_2$)$_3$; 49.4 ppm, NCH$_2$CH$_2$CN; 24.9 ppm, NCH$_2$ CH$_2$CN; 16.9 ppm CH$_2$CN. $^1$H NMR (200 MHz, CDCl$_3$): 2.85 ppm, t, 2H, NCH$_2$CH$_2$CN; 2.55 ppm, m, 1H, NCH$_2$ (CH$_2$)$_3$; 2.48 ppm, t, 2H, CH$_2$CN; 1.55 ppm, m, 1H, CH$_2$CH$_2$N.

Example II 8.0 g of Raney nickel catalyst (BLM 112 W$^R$ from Degussa; the composition as specified by the supplier is 85 wt. % Ni, 2.0 wt. % Fe, 2.5 wt. % Cr and 9.7 wt. % Al) was pretreated with 0.8 g of KOH dissolved in 10 ml of demineralized water. Then the catalyst was 'rinsed' three times using 50 ml of ethylenediamine (EDA). The temperature during this pretreatment was 20° C.

Then the catalyst and 100 ml of EDA were introduced into an autoclave with a volume of 160 ml. The autoclave was closed, flushed several times with H$_2$ gas and then heated to a temperature of 40° C., at a pressure of 60 atm. H$_2$, while the reactor contents were stirred.

Next, 4 g of DAB(ACN)$_4$ dissolved in 10 g of EDA was pressed into the autoclave with the aid of a so-called apportioning vessel, e.g. a "dosing vessel", that had been flushed with H$_2$ gas several times and had been brought to a pressure of 70 atm. The reduction reaction took place at a pressure of 70 atm. Complete reduction took 120 minutes. Analysis of the isolated product by means of $^{13}$C NMR spectroscopy showed that the product obtained was 1,4-diaminobutane-n,n'-tetra-1-propylamine, DAB(PA)$_4$.

$^{13}$C NMR (50 MHz, D$_2$O): 53.4 ppm, N CH$_2$CH$_2$CH$_2$CH$_2$ (2×); 51.1 ppm, NCH$_2$CH$_2$CH$_2$NH$_2$ (4×); 39.5 ppm, CH$_2$NH$_2$ (4×); 28.8 ppm, CH$_2$CH$_2$NH$_2$ (4×); 23.9 ppm, NCH$_2$CH$_2$CH$_2$N (2×).

Example III

Example I was repeated, only now 5.0 g of DAB(PA)$_4$ was used as a substrate instead of 1,4-diaminobutane.

Analysis of the isolated product by means of $^{13}$C NMR spectroscopy showed that the product obtained was DAB(PA)$_4$(ACN)$_8$. The yield was 91%.

$^{13}$C NMR (50 MHz, CDCl$_3$): 118.9 ppm, CN (8×); 53.9 ppm, NCH$_2$CH$_2$CH$_2$CH$_2$ (2×); 51.5 and 51.4 ppm, N CH$_2$CH$_2$CH$_2$N (8×); 49.6 ppm, NCH$_2$CH$_2$CN (8×); 25.0 and 24.9 ppm, NCH$_2$CH$_2$CH$_2$ and NCH$_2$CH$_2$CH$_2$N (6×); 16.9 ppm, CH$_2$CN (8×).

Example IV

Example II was repeated, only now 2.0 g of DAB(PA)$_4$(ACN)$_8$ was reduced for 1200 minutes to obtain DAB(PA)$_4$(PA)$_8$, as appeared from analysis of the isolated product by means of $^{13}$C NMR spectroscopy.

$^{13}$C NMR (50 MHz, D$_2$O): 53.6 ppm, NCH$_2$CH$_2$CH$_2$ CH$_2$ (2×); 51.7 ppm, NCH$_2$CH$_2$CH$_2$N (8×); 51.2 ppm, N CH$_2$CH$_2$CH$_2$NH$_2$ (8×); 39.6 ppm CH$_2$NH$_2$ (8×); 28.9 ppm, CH$_2$CH$_2$NH$_2$ (8×); 24.1 ppm, NCH$_2$CH$_2$l CH$_2$N (2×); 22.3 ppm, NCH$_2$CH$_2$CH$_2$N (4×).

Example V

Example III was repeated, only now 2.0 g of DAB(PA)$_4$(PA)$_8$ was used as a substrate instead of DAB(PA)$_4$.

The isolated product was analyzed with the aid of $^{13}$C NMR spectroscopy, which showed that it was DAB(PA)$_4$(PA)$_8$(ACN)$_{16}$.

$^{13}$C NMR (50 MHz, CDCl$_3$): 119.0 ppm, CN (16×); 54.1 ppm, NCH$_2$CH$_2$CH$_2$CH$_2$ (2×); 52.2 ppm, NCH$_2$CH$_2$CH$_2$ (8×); 51.5 and 51.4 ppm, NCH$_2$CH$_2$CH$_2$ (16×); 49.5 ppm, N CH$_2$CH$_2$CN (16×); 25.0 and 24.9 ppm NCH$_2$CH$_2$CH$_2$CH$_2$ en NCH$_2$CH$_2$CH$_2$N (10×); 24.3 ppm, NCH$_2$CH$_2$CH$_2$N (4×); 16.9 ppm, CH$_2$CN (16×).

Example VI

Example IV was repeated, only now 2.0 g of DAB(PA)$_4$(PA)$_8$(ACN)$_{16}$ was reduced at a temperature of 40° C. for 4200 minutes to obtain DAB(PA)$_4$(PA)$_8$(PA)$_{16}$, as appeared from analysis of the results obtained with the aid of $^{13}$C NMR spectroscopy.

$^{13}$C NMR (50 MHz, D$_2$O): 53.6 ppm, N CH$_2$CH$_2$CH$_2$CH$_2$ (2×); 51.7 ppm, NCH$_2$CH$_2$CH$_2$N (24×); 51.2 ppm, NCH$_2$CH$_2$CH$_2$NH$_2$ (16×); 39.6 ppm, CH$_2$NH$_2$ (16×); 28.9 ppm, CH$_2$CH$_2$NH$_2$ (16×); 24.1 ppm, NCH$_2$ CH$_2$CH$_2$CH$_2$N (2×); 22.3 ppm, NCH$_2$CH$_2$CH$_2$N (12×).

Example VII

Example V was repeated, only now 3.0 g of $DAB(PA)_4(PA)_8(PA)_{16}$ was used as a substrate instead of $DAB(PA)_4(PA)_8$.

The isolated product was analyzed with the aid of $^{13}C$ NMR spectroscopy, which showed that the product obtained was $DAB(PA)_4(PA)_8(PA)_{16}(ACN)_{32}$.

$^{13}C$ NMR (50 MHz., $CDCl_3$): 119.0 ppm, CN (32×); 54.2 ppm N$\underline{CH}_2CH_2CH_2CH_2$ (2×); 52.2 ppm, N$\underline{CH}_2CH_2\underline{CH}_2$ (24×); 51.4 ppm, N$\underline{CH}_2CH_2\underline{CH}_2$ (32×); 49.4 ppm, N$\underline{CH}_2CH_2CN$ (32×); 24.9 ppm N$CH_2\underline{CH}_2\underline{CH}_2CH_2$ and N$CH_2\underline{CH}_2CH_2N$ (18×); 24.4 ppm, $NCH_2\underline{CH}_2CH_2N$ (12×); 16.8 ppm, $\underline{CH}_2CN$ (32×).

Example VIII

Example VI was repeated only now 2.0 g of $DAB(PA)_4(PA)_8(PA)_{16}(ACN)_{32}$ was reduced for 4200 minutes at a temperature of 60° C. to obtain $DAB(PA)_4(PA)_8(PA)_{16}(PA)_{32}$, as appeared from the analysis of the results obtained by means of $^{13}C$ NMR spectroscopy.

$^{13}C$ NMR (50 MHz, $D_2O$): 51.7 ppm, N$\underline{CH}_2CH_2\underline{CH}_2N$ (56×); 51.2 ppm, N$\underline{CH}_2CH_2NH_2$ (32×); 39.6 ppm, $\underline{CH}_2NH_2$ (32×); 28.8 ppm, $\underline{CH}_2CH_2NH_2$ (32×); 22.3 ppm, $NCH_2\underline{CH}_2CH_2N$ (28×).

Example IX

Example VII was repeated only now 2.0 g of $DAB(PA)_4(PA)_8(PA)_{16}(PA)_{32}$ was used as a substrate instead of $DAB(PA)_4(PA)_8(PA)_{16}$.

The product obtained was analyzed with the aid of $^{13}C$ NMR spectroscopy, which showed that it was $DAB(PA)_4(PA)_8(PA)_{16}(PA)_{32}(ACN)_{64}$.

$^{13}C$ NMR (50 MHz, $CDCl_3$): 119.0 ppm, CN (64×); 54.2 ppm, N$\underline{CH}_2CH_2CH_2CH_2$ (2×); 52.2 ppm, N$\underline{CH}_2CH_2\underline{CH}_2$ (56×); 51.4 ppm, N$\underline{CH}_2CH_2\underline{CH}_2$ (64×); 49.5 ppm, N$\underline{CH}_2CH_2CN$ (64×); 25.0 ppm, $NCH_2\underline{CH}_2\underline{CH}_2CH_2$ and $NCH_2\underline{CH}_2CH_2N$ (34×); 24.2 ppm, $NCH_2\underline{CH}_2CH_2N$ (28×); 16.9 ppm, $\underline{CH}_2CN$ (64×).

Example X

Example VIII was repeated only now 2.0 g of $DAB(PA)_4(PA)_8(PA)_{16}(PA)_{32}(ACN)_{64}$ was reduced for 4200 minutes at a temperature of 80° C. to obtain $DAB(PA)_4(PA)_8(PA)_{16}(PA)_{32}(PA)_{64}$, as appeared from analysis of the results obtained by means of $^{13}C$ NMR spectroscopy.

$^{13}C$ NMR (50 MHz, $D_2O$): 51.7 ppm, N$\underline{CH}_2CH_2\underline{CH}_2N$ (120×); 51.2 ppm, N$\underline{CH}_2CH_2NH_2$ (64×); 39.6 ppm, $\underline{CH}_2NH_2$ (64×); 28.8 ppm, $\underline{CH}_2CH_2NH_2$ (64×); 22.3 ppm, $NCH_2\underline{CH}_2CH_2N$ (60×).

Example XI 20 g of acrylonitrile was dissolved in 10 ml of methanol. At a temperature of 10° C. this solution was then added dropwise to a solution of 5.0 g of ethanolamine (ETAM) in methanol. Then the reaction mixture was heated for 16 hours (at a temperature of 40° C.). After evaporation of the solvent and washing of the residue with ether, analysis of the results of $^1H$ and $^{13}C$ NMR spectroscopy showed that the reaction product obtained was dinitrile ethanol $(ETAM(ACN)_2)$. This suggests that the reaction involved the amine moieties rather than the hydroxyl moieties.

$^{13}C$ NMR (50 MHz, $CDCl_3$): 119.0 ppm, CN; 59.5 ppm, $\underline{CH}_2OH$; 55.5 ppm, $\underline{CH}_2CH_2OH$; 49.7 ppm, N$\underline{CH}_2CH_2CN$; 17.4 ppm, $\underline{CH}_2CN$. $^1H$ NMR (200MHz, $CDCl_3$): 3.66 ppm, t, 1H, $\underline{CH}_2OH$; 2.91 ppm, t, 2H, $\underline{CH}_2CH_2CN$; 2.72 ppm, 1H, t, N$\underline{CH}_2CH_2OH$; 2.53 ppm, 2H, t, $CH_2CN$.

Example XII

Example II was repeated only now 2.0 g of $ETAM(ACN)_2$, dissolved in methanol, was used as a substrate. After 60 minutes at a temperature of 40° C. complete and selective reduction appeared to have taken place in methanol and analysis of the product obtained by means of $^{13}C$ NMR spectroscopy showed that the desired $ETAM(PA)_2$ had been obtained.

$^{13}C$ NMR (50 MHz, $D_2O$): 59.1 ppm, $\underline{CH}_2OH$; 55.0 ppm, N$\underline{CH}_2CH_2OH$; 51.8 ppm, N$\underline{CH}_2CH_2CH_2NH_2$ (2×); 39.5 ppm, $\underline{CH}_2NH_2$ (2×); 28.9 ppm, $\underline{CH}_2CH_2NH_2$ (2×).

Example XIII

At a temperature of 5° C. 10 g of acrylonitrile (189 mmol) was added dropwise to 0.5 g of anion exchanger (Lewatit MP 500 MB$^R$, brought into hydroxy configuration with the aid of a 3% NaOH solution (treating ion exchanger to remove $Cl^-$ ions and replace with $OH^-$ groups), followed by rinsing with water to a neutral pH) and 2.0 g of polyethylene glycol (PEG, $M_n$=455, 4.4 mmol). The mixture obtained was stirred for 12 hours at a temperature of 20° C. The product obtained was filtered off (to separate it from the ion exchange resin), and rinsed with dichloromethane. After evaporation of the dichloromethane and the excess acrylonitrile the product was washed with diethylether (three times). Analysis of the results obtained by means of $^{13}C$ NMR spectroscopy showed that the isolated oil was $PEG(ACN)_2$.

$^{13}C$ NMR (50 MHz, $CDCl_3$): 70.5 ppm, $OCH_2$—$CH_2O$; 65.9 ppm, $O\underline{CH}_2$—$CH_2CN$; 18.8 ppm, $\underline{CH}_2CN$; 118.2 ppm, CN.

Example XIV

Example II was repeated only now 2.0 g of $PEG(ACN)_2$ was used as a substrate and methanol as a solvent for the reaction. After 300 minutes at a temperature of 37° C. complete and selective reduction appeared to have taken place and analysis of the results obtained by means of $^{13}C$ NMR spectroscopy showed that the desired $PEG(PA)_2$ had been obtained.

$^{13}C$ NMR (50 MHz, $D_2O$): 70.0 ppm, $OCH_2$—$CH_2O$; 69.3 ppm, $O\underline{CH}_2CH_2CH_2NH_2$; 38.2 ppm, $\underline{CH}_2NH_2$; 32.0 ppm, $\underline{CH}_2CH_2NH_2$.

Example XV 1.0 g of ε-aminocaproic acid (ε-AC, 8.0 mmol) was dissolved in 10 ml of water and deprotonated with 0.5 equivalents of $K_2CO_3$. At a temperature of 0° C. an excess amount of acrylonitrile was then added (4 molar equivalents). Then the mixture was heated for 12 hours (at a temperature of 40° C.). Analysis of the results of $^{13}C$ NMR spectroscopy showed that the colorless oil that was obtained after evaporation of the solvents and the excess acrylonitrile was ε-$AC(ACN)_2$.

$^{13}C$ NMR (50 MHz, $CDCl_3$): 184.0 ppm, CO; 121.4 ppm, CN;, 53.0 ppm, N$\underline{CH}_2CH_2CH_2CH_2$; 48.8 ppm, N$\underline{CH}_2CH_2CN$; 38.1 ppm, $CH_2CO$; 27.0 ppm, $NCH_2$ CH$_2$CH$_2$; 26.2/26.1 ppm CH$_2$CH$_2$CH$_2$CH$_2$CO; 15.6 ppm, CH$_2$CN.

Example XVI

Example II was repeated only now 2.0 g of ε-AC(ACN)$_2$ was dissolved in water and used as a substrate. After 120 minutes at a temperature of 40° C. complete and selective reduction appeared to have taken place and analysis of the results obtained by means of $^{13}$C NMR spectroscopy showed that the desired ε-AC(PA)$_2$ had been obtained.

$^{13}$C NMR (50 MHz, CDCl$_3$): 182.6 ppm CO; 53.9 ppm, NCH$_2$CH$_2$CH$_2$CH$_2$; 51.6 ppm, NCH$_2$CH$_2$CH$_2$NH$_2$ (2×); 40.0 ppm, CH$_2$NH$_2$ (2×); 38.8 ppm, CH$_2$CO; 29.5 ppm, CH$_2$CH$_2$NH$_2$ (2×); 27.8 ppm, NCH$_2$CH$_2$; 26.5 ppm/25.8 ppm, NCH$_2$CH$_2$CH$_2$CH$_2$CH$_2$.

Example XVII

Example II was repeated only now n-butanol was used as a rinsing agent for the catalyst and as a solvent for the substrate and for the reaction. After 180 minutes at a temperature of 40° C., the reaction was complete and selective reduction appeared to have taken place to the desired DAB(PA)$_4$.

$^{13}$C NMR (50 MHz, D$_2$O): 53.4 ppm, N CH$_2$CH$_2$CH$_2$CH$_2$ (2×); 51.1 ppm, NCH$_2$CH$_2$CH$_2$NH$_2$ (4×); 39.5 ppm, CH$_2$NH$_2$ (4×); 28.8 ppm, CH$_2$CH$_2$NH$_2$ (4×); 23.9 ppm, NCH$_2$CH$_2$CH$_2$CH$_2$N (2×).

Example XVIII

Example II was repeated only now the catalyst was rinsed with tetrahydrofuran (THF). Then 2.0 g of DAB(ACN)$_4$ was dissolved in THF and THF was also used as a solvent for the reaction. A H$_2$ pressure of 30 atmosphere was used and the reaction was conducted at a temperature of 80° C. After 120 minutes, the reaction was complete and selective reduction appeared to have taken place to the desired DAB(PA)$_4$.

$^{13}$C NMR (50 MHz, D$_2$O): 53.4 ppm, N CH$_2$CH$_2$CH$_2$CH$_2$ (2×); 51.1 ppm, NCH$_2$CH$_2$CH$_2$NH$_2$ (4×); 39.5 ppm, CH$_2$NH$_2$ (4×); 28.8 ppm, CH$_2$CH$_2$NH$_2$ (4×); 23.9 ppm, NCH$_2$CH$_2$CH$_2$CH$_2$N (2×).

Example XIX

Example XVIII was repeated only now use was made of a reaction temperature of 40° C. After 240 minutes, the reaction was complete and selective reduction to the desired DAB(PA)$_4$ appeared to have taken place.

$^{13}$C NMR (50 MHz, D$_2$O): 53.4 ppm, N CH$_2$CH$_2$CH$_2$CH$_2$ (2×); 51.1 ppm, NCH$_2$CH$_2$CH$_2$NH$_2$ (4×); 39.5 ppm, CH$_2$NH$_2$ (4×); 28.8 ppm, CH$_2$CH$_2$NH$_2$ (4×); 23.9 ppm, NCH$_2$CH$_2$CH$_2$CH$_2$N (2×).

Example XX 8.0 g of Raney nickel catalyst (BLM 112 W$^R$ from Degussa; the composition contains 85 wt. % Ni, 2.0 wt. % Fe, 2.5 wt. % Cr and 9.7 wt. % Al) was pretreated with KOH in the same manner as in example II. After this pretreatment the catalyst was rinsed once with 50 ml of demineralized water. Then the catalyst was transferred to the autoclave along with 100 ml of demineralized water, after which the autoclave was flushed with H$_2$ gas and heated to a temperature of 60° C. Then 4.0 g of DAB(ACN)$_4$ was dissolved in 5.0 ml of methanol and transferred to the autoclave. In 90 minutes, at a H$_2$ pressure of 70 atmospheres the reaction was, complete and selective reduction to DAB(PA)$_4$ took place.

$^{13}$C NMR (50 MHz, D$_2$O): 53.4 ppm, N CH$_2$CH$_2$CH$_2$CH$_2$ (2×); 51.1 ppm, NCH$_2$CH$_2$CH$_2$NH$_2$ (4×); 39.5 ppm, CH$_2$NH$_2$ (4×); 28.8 ppm, CH$_2$CH$_2$NH$_2$ (4×); 23.9 ppm, NCH$_2$CH$_2$CH$_2$CH$_2$N (2×).

Example XXI

Example XX was repeated only Raney Cobalt (type Grace 2724$^R$, promoted with Cr) was used as a catalyst. After 15 minutes the reaction was complete and selective reduction to the desired DAB(PA)$_4$ had taken place.

$^{13}$C NMR (50 MHz, D$_2$O): 53.4 ppm, N CH$_2$CH$_2$CH$_2$CH$_2$ (2×); 51.1 ppm, NCH$_2$CH$_2$CH$_2$NH$_2$ (4×); 39.5 ppm, CH$_2$NH$_2$ (4×); 28.8 ppm, CH$_2$CH$_2$NH$_2$ (4×); 23.9 ppm, NCH$_2$CH$_2$CH$_2$CH$_2$N (2×).

Example XXII 10 g of melamine (1,3,5-trishexamethyleneamine) (23.6 mmol MEL(HMA)$_3$) was dissolved in 150 ml of methanol. The solution obtained was added to 15 g of acrylonitrile (283 mmol) at a temperature of 0° C. The mixture thus obtained was stirred for 1 hour at a temperature of 20° C. and then for 12 hours at a temperature of 45° C. The solvent and the excess acrylonitrile were removed at reduced pressure with the aid of a rotary evaporator ("rotovapor") at a temperature of 40° C. The results of $^{13}$C NMR spectroscopic analysis showed that the product obtained after precipitation in diethylether and isolation, a viscous red oil, was pure MEL(HMA)$_3$(ACN)$_6$.

$^{13}$C NMR (50 MHz, CDCl$_3$): 165.8 ppm, NCN (3×); 118.7 ppm, CN (6×); 53.4 ppm, NCH$_2$CH$_2$CH$_2$ (3×); 49.6 ppm, NCH$_2$CH$_2$CN (6×); 40.5 ppm, NCH$_2$ (3×); 29.7 ppm, NCH$_2$CH$_2$ (3×); 27.3 ppm, 26.8 ppm, 26.7 ppm, NCH$_2$CH$_2$CH$_2$CH$_2$CH$_2$CH$_2$NH (9×); 17.0 ppm, CH$_2$CN (6×).

Example XXIII

Example XX was repeated only now 2.3 g of MEL(HMA)$_3$(ACN)$_6$ was dissolved as a substrate. The reduction reaction was carried out at a temperature of 60° C. The $^{13}$C and $^1$H NMR spectra showed that complete and selective reduction to the desired melamine(HMA)$_3$(PA)$_6$ had taken place after 1020 minutes' reaction.

$^{13}$C NMR (50 MHz, D$_2$O).: 165.7 ppm, NCN (3×); 53.7 ppm, NCH$_2$CH$_2$CH$_2$CH$_2$ (3×); 51.3 ppm, NCH$_2$CH$_2$NH$_2$ (6×); 40.8 ppm, NHCH$_2$ (3×); 39.7 ppm, CH$_2$NH$_2$ (6×); 29.8 ppm, NHCH$_2$CH$_2$ (3×); 29.1 ppm, CH$_2$CH$_2$NH$_2$ (6×); 27.6 ppm, 26.9 ppm, 25.6 ppm, NCH$_2$CH$_2$CH$_2$CH$_2$CH$_2$NH (9×).

Example XXIV 25 g of Jeffamine D-2000$^R$ (a primary amide terminated polypropylene oxide, M$_w$=2000, Texaco Chemical Company) was dissolved in 50 ml of methanol. The solution obtained was added to 6.0 g of acrylonitrile at a temperature of 0° C. The resultant mixture was stirred for 1 hour at a temperature of 20° C. and then for 12 hours at a temperature of 40° C. Then the product obtained was dissolved in a mixture of 100 ml of pentane and 5.0 ml of diethylether. The results of $^{13}$C NMR spectroscopic analysis showed that the product obtained after isolation was Jeff(ACN)$_4$ (a colorless liquid; yield 94%).

$^{13}$C NMR (50 MHz, CDCl$_3$): 118.7 ppm, CN; 75.1–75.7 ppm, OC$\underline{H}_2$; 73.0–73.6 ppm, NCH; 52.2–52.5 ppm, NC$\underline{H}_2$CH$_2$CN; 17.2–17.5 ppm, CC$\underline{H}_3$; 19.1 ppm, C$\underline{H}_2$CN.

Example XXV 8.0 g of Raney Nickel catalyst (BLM 112 W$^R$ from Degussa; the composition contains 85 wt. % Ni, 2.0 wt. % Fe, 2.5 wt. % Cr and 9.7 wt. % Al) was pretreated with 0.8 g of KOH dissolved in 10 ml of demineralized water. After precipitation of the catalyst thus obtained, the water layer was decanted and then 50 ml of ethylenediamine was added while the mixture was stirred to wash the catalyst. Then the washed catalyst was filtered off and was added to 100 ml of ethylenediamine in a 160-ml autoclave. The autoclave was closed and was flushed several times with H$_2$ gas. Next, 70-bar H$_2$ gas was introduced into the autoclave, at a temperature of 38° C., and the contents were intensively stirred.

Then 2.0 g of Jeff(ACN)$_4$, dissolved in 10 g of ethylenediamine, was introduced into the autoclave. Complete reduction was found to have taken place after 3 hours. $^{13}$C NMR spectroscopy showed that the product obtained was pure Jeff(PA)$_4$.

$^{13}$C NMR (50 MHz, D$_2$O): 74.8–75.9 ppm, OC$\underline{H}_2$; 72.4–73.3 ppm, NCH; 53.0–52.7 ppm, NC$\underline{H}_2$CH$_2$NH$_2$; 39.1 ppm, C$\underline{H}_2$NH$_2$; 32.3 ppm, C$\underline{H}_2$CH$_2$NH$_2$; 16.5–17.3 ppm, CC$\underline{H}_3$.

Example XXVI 900 ml of water and 75 g (0.85 mol) of 1,4-diaminobutane (substrate) were introduced into a three-necked flask with a volume of 2 liters, which was fitted with a stirrer, a cooler, a thermometer and a dropping funnel. After this mixture had been cooled to a temperature of 10° C., a solution of 200 g (3.8 mol) of acrylonitrile was added dropwise in 2 hours. Then the reaction mixture thus obtained was heated for 9 hours (temperature 65° C.).

After the mixture had then cooled to room temperature the water and the excess acrylonitrile were evaporated as an azeotrope. The residue thus obtained, which contained DAB(ACN)$_4$ and water, was then reduced with the aid of Raney cobalt catalyst that had not been pretreated. The reaction was stopped after 1 hour by cooling to room temperature and terminating the supply of hydrogen, after which the desired product was obtained as a colorless oil. Analysis of the product by means of $^{13}$C NMR spectroscopy showed that pure DAB(PA)$_4$ had been formed. The yield was 98%.

$^{13}$C NMR (50 MHz, D$_2$O): 53.4 ppm, NC$\underline{H}_2$CH$_2$CH$_2$CH$_2$ (2×); 51.1 ppm, NC$\underline{H}_2$CH$_2$CH$_2$NH$_2$ (4×); 39.5 ppm, C$\underline{H}_2$NH$_2$ (4×); 28.8 ppm, C$\underline{H}_2$CH$_2$NH$_2$ (4×); 23.9 ppm, NCH$_2$C$\underline{H}_2$CH$_2$CH$_2$N (2×).

Example XXVII

The thermal stability of the dendritic macromolecules obtained in examples I through VIII was measured via thermogravimetric analysis (TGA). This was done by heating approx. 2.5 mg of the product in question with the aid of a Perkin Elmer (7-series) in a neon atmosphere from 30° C. to 900° C., at a rate of 20° C./min. Table 1 shows the temperatures at which maximum decomposition of the product takes place.

TABLE 1

Results of the TGA of the products obtained in examples I through VII.

| Product | Temperature [°C.] |
|---|---|
| DAB(ACN)$_4$ | 330.1 |
| DAB(PA)$_4$ | 330.0 |
| DAB(PA)$_4$(ACN)$_8$ | 331.8 |
| DAB(PA)$_4$(PA)$_8$ | 378.0 |
| DAB(PA)$_4$(PA)$_8$(ACN)$_{16}$ | 332.0 |
| DAB(PA)$_4$(PA)$_8$(PA)$_{16}$ | 424.0 |
| DAB(PA)$_4$(PA)$_8$(PA)$_{16}$(ACN)$_{32}$ | 331.5 |

Example XXVIII 900 ml of water and 75 g (0.85 mol) of diaminobutane were introduced into a 2-liter three-necked flask fitted with a stirrer, a cooler, a thermometer and a dropping funnel. After this mixture had been cooled to a temperature of 10° C., a solution of 200 g of acrylonitrile in 50 ml of methanol was added dropwise, at such a rate that the temperature of the reaction mixture remained below 15° C. After the entire amount had been added the reaction mixture was kept at room temperature for two hours, after which it was heated to a temperature of 65° C. for 9 hours. Then the reaction mixture was cooled to room temperature and the product was isolated.

The results of $^1$H and $^{13}$C NMR spectroscopy and mass spectrometry showed that the isolated product was DAB(ACN)$_4$.

$^{13}$C NMR (50 MHz, D$_2$O): 119 ppm, CN; 53.1 ppm, NC$\underline{H}_2$(CH$_2$)$_3$; 49.4 ppm, NC$\underline{H}_2$CH$_2$CN; 24.9 ppm, NCH$_2$C$\underline{H}_2$CN; 16.9 ppm C$\underline{H}_2$CN. $^1$H NMR (200 MHz, CDCl$_3$): 2.85 ppm, t, 2H, NC$\underline{H}_2$CH$_2$CN; 2.55 ppm, m, 1H, NC$\underline{H}_2$(CH$_2$)$_3$; 2.48 ppm, t, 2H, CH$_2$CN; 1.55 ppm, m, 1H, C$\underline{H}_2$CH$_2$N.

Example XXIX 30 ml of water and 5.0 g (58 mmol) of diaminobutane were introduced into a three-necked flask with a volume of 250 ml that was fitted with a stirrer, a cooler, a thermometer and a dropping funnel. After the mixture had been cooled to a temperature of 10° C., a solution of 15 g (280 mmol) of acrylonitrile was added dropwise, at such a rate that the temperature remained below 15° C. After the entire solution had been added, the mixture was kept at room temperature for two hours, after which the reaction mixture was heated to a temperature of 45° C. for 16 hours.

After cooling of the reaction mixture to room temperature the water and the excess acrylonitrile were evaporated. 2.5 g of the product obtained (DAB(ACN)$_4$) was dissolved in 4 ml of methanol. This solution was introduced into a 160-ml autoclave along with 8.0 g of Raney cobalt catalyst (type Grace 2724$^R$, promoted with Cr). Then the autoclave was closed, flushed several times with H$_2$ gas and heated to a temperature of 80° C. under an H$_2$ atmosphere (80 bar pressure), with stirring of the reactor contents. These reaction conditions were maintained for one hour.

After removal of the catalyst through filtration, and evaporation of the water, 2.0 g of the residue (DAB(PA)$_4$) was dissolved in 20 ml of water, to which solution 5.4 g of acrylonitrile was added dropwise, at a temperature of 10° C. The mixture was kept at room temperature for two hours, after which it was heated for 16 hours at a temperature of 40°

C. After cooling the water and the excess acrylonitrile were evaporated under reduced pressure. The colorless residue thus obtained (pure DAB(PA)$_4$(ACN)$_8$) was then reduced in the same manner as DAB(ACN)$_4$ as described in this example. Complete and selective reduction took place within 90 minutes.

The DAB(PA)$_4$(PA)$_8$ thus formed was dissolved in 30 ml of water. Next, 5.0 g of acrylonitrile was added dropwise at a temperature of 10° C. Then the reaction mixture was kept at room temperature for two hours, after which it was heated to 40° C. for 16 hours. After cooling, the water and the excess acrylonitrile were evaporated under reduced pressure, after which the colorless residue, i.e. DAB(PA)$_4$(PA)$_8$(ACN)$_{16}$, was completely and selectively reduced to DAB(PA)$_4$(PA)$_8$(PA)$_{16}$ in two hours, in the manner described in this example for the reduction of DAB(ACN)$_4$.

Example XXX

Ethylacrylate (EAC, 6.3 g; 63 mmol) was dissolved in 20 ml of methanol. The solution obtained was cooled in an ice bath, while 0.5 g of DAB(PA)$_4$ was added with stirring. The resulting mixture was stirred at room temperature for 20 hours, after which the product, a light yellow liquid, was isolated. $^{13}$C NMR spectroscopic analysis of the product showed that pure DAB(PA)$_4$(EAC)$_8$ had been formed.

$^{13}$C NMR (50 MHz, CDCl$_3$): 172.5 ppm, CO (8×); 60.2 ppm, COOC$\underline{H}_2$ (8×); 54.1 ppm, NC$\underline{H}_2$CH$_2$CH$_2$CH$_2$ (2×); 51.9 ppm, NCH$_2$C$\underline{H}_2$CH$_2$N (8×); 49.1 ppm, NC$\underline{H}_2$CH$_2$CO (8×); 32.6 ppm, C$\underline{H}_2$CO (8×); 25.0 ppm, NCH$_2$C$\underline{H}_2$CH$_2$CH$_2$ (2×); 24.7 ppm, NCH$_2$C$\underline{H}_2$CH$_2$N (4×); 14.2 ppm, CH$_3$ (8×).

Example XXXI

DAB(PA)$_4$(EAC)$_8$(0.5 g, 0.45 mmol) was dissolved in 3.0 ml of methanol. The solution obtained was cooled to a temperature of 0° C. with the aid of an ice bath, while a large excess of ethanolamine (EA) was added dropwise. Then the product was isolated. $^{13}$C NMR spectroscopic analysis of the product, a yellow oil, showed that pure DAB(PA)$_4$(HA)$_8$ had been formed.

$^{13}$C NMR (50 MHz, D$_2$O): 175.6 ppm, CONH (8×); 60.3 ppm, C$\underline{H}_2$OH (8×); 53.3 ppm, C$\underline{H}_2$CH$_2$CH$_2$C$\underline{H}_2$ (2×); 51.5 ppm en 51.2 ppm, NCH$_2$C$\underline{H}_2$CH$_2$N (8×); 49.1 ppm, NC$\underline{H}_2$CH$_2$CO (8×); 41.8 ppm, CONHC$\underline{H}_2$ (8×); 32.9 ppm, C$\underline{H}_2$CO (8×); 24.0 ppm, NCH$_2$C$\underline{H}_2$CH$_2$CH$_2$ (2×).

Example XXXII 1200 ml water and 150 g (1.7 mol) of 1,4-diaminobutane (DAB, substrate) were introduced into a three-neck 2-liter flask provided with a stirrer. 400 g of pure acrylonitrile (ACN) were added in one shot to this mixture. The resulting reaction mixture was heated at 80° C. for 1 hour.

Next, both the water and the excess of acrylonitrile were evaporated off under reduced pressure at a temperature of 50° C. HPLC analysis of the resulting residue showed that >99% pure product had been obtained without additional recrystallization of the residue. Recrystallization of the residue in methanol gave no further improvement of the purity of the product.

The isolated product was analyzed by means of $^1$H-NMR and $^{13}$C-NMR and mass spectrometry, which revealed that the product obtained was DAB(ACN)$_4$.

$^{13}$C NMR (50 MHz CDCl$_3$): 118.8 ppm, CN; 53.9 ppm, NC$\underline{H}_2$ (CH$_2$)$_3$; 49.6 ppm, NC$\underline{H}_2$CH$_2$CN; 25.1 ppm, NCH$_2$ C$\underline{H}_2$CN; 14.1 ppm C$\underline{H}_2$CN. $^1$H NMR (200MHz, CDCl$_3$): 2.85 ppm, t, 2H, NC$\underline{H}_2$CH$_2$CN; 2.55 ppm, m, 1H, NC$\underline{H}_2$ (CH$_2$)$_3$; 2.48 ppm, t, 2H, CH$_2$CN; 1.58 ppm, m, 1H, C$\underline{H}_2$CH$_2$N.

Example XXXIII 5.6 g of Raney cobalt catalyst (wet) (type Grace 2724 from Grace; manufacturer's specifications: 78–96 wt. % Co, 0.5–5 wt. % Cr, 0.5–5 wt. % Ni, 3–12 wt. % Al) were washed once with 25 ml of ethanol at a temperature of 20° C. Then the catalyst was introduced into an autoclave and methanol was added. Finally, about 22.7 g of DAB(ACN)$_4$ (7 wt. % water) in powder form were added. 12.3 wt % of dry catalyst relative to DAB(ACN)$_4$ was added.

When the autoclave had been closed, stirring of the mixture was started and the autoclave was purged three times with N$_2$ gas and three times with H$_2$ gas. After letting off the pressure, about 6.3 g of liquid ammonia were supplied to the autoclave. The molar ratio between the ammonia and DAB(ACN)$_4$ was about 4.9. Next, the autoclave was heated with stirring to 65° C. at a H$_2$ pressure of 80 bar.

The reaction was carried out under an H$_2$ atmosphere for 20 minutes. The reaction was stopped by cooling the autoclave to room temperature. Then the H$_2$ was drained, the autoclave was purged three times with N$_2$ gas, the autoclave was opened, and the contents of the autoclave were immediately filtered off.

The isolated product was analyzed by means of $^{13}$C NMR spectroscopy, which revealed that the product obtained was 1,4-diaminobutane-n,n'-tetra-1-propylamine, DAB(PA)$_4$. The conversion was virtually complete.

$^{13}$C NMR (50 MHz CDCl$_3$): 54.0 ppm, NC$\underline{H}_2$CH$_2$CH$_2$CH$_2$ (2×); 51.9 ppm, NC$\underline{H}_2$CH$_2$CH$_2$NH$_2$ (4×); 40.7 ppm, C$\underline{H}_2$NH$_2$ (4×); 31.0 ppm, C$\underline{H}_2$CH$_2$NH$_2$ (4×); 25.0 ppm, NCH$_2$C$\underline{H}_2$CH$_2$CH$_2$N (2×).

Example XXXIV

Example XXXII was repeated, using 5.0 g of DAB(PA)$_4$ as substrate instead of 1,4-diaminobutane. To this mixture, 20.67 g of ACN were added in one shot. The reaction mixture thus obtained was heated at 80° C. for 2 hours.

The isolated product was analyzed by means of $^{13}$C NMR spectroscopy, which revealed that the product obtained was DAB(PA)$_4$(ACN)$_8$. The yield was >99.7%.

$^{13}$C NMR (50 MHz, CDCl$_3$): 119.0 ppm, CN (8×); 53.9 ppm, NC$\underline{H}_2$CH$_2$CH$_2$C$\underline{H}_2$ (2×); 51.5 and 51.4 ppm, N C$\underline{H}_2$C$_2$C$\underline{H}_2$N (8×); 49.5 ppm, NC$\underline{H}_2$CH$_2$CN (8×); 24.95 ppm, NCH$_2$C$\underline{H}_2$CH$_2$CH$_2$ and NCH$_2$C$\underline{H}_2$CH$_2$N (6×); 16.9 ppm, C$\underline{H}_2$CN (8×).

Example XXXV

Example XXXIII was repeated, with 11.23 g of Raney cobalt catalyst (wet) being washed once with about 25 ml of methanol at a temperature of 20° C. and then introduced into the autoclave, after which methanol was added to a total weight of 46.87 g of methanol. Finally, about 28.2 g of DAB(PA)$_4$(ACN)$_8$ (containing 20 wt. % of water) were added. About 24.9% of catalyst relative to DAB(PA)$_4$(ACN)$_8$ was added. About 4.5 g of liquid ammonia were introduced into the autoclave. The molar ratio between ammonia and DAB(PA)$_4$(ACN)$_8$ was about 8.7.

DAB(PA)$_4$(ACN)$_8$ was reduced to DAB(PA)$_4$(PA)$_8$ in 200 minutes at 46° C. and a H$_2$ pressure of 80 bar.

The isolated product was analyzed by means of $^{13}$C NMR spectroscopy, which revealed that the product obtained was DAB(PA)$_4$(PA)$_8$.

$^{13}$C NMR (50 MHz, CDCl$_3$): 54.1 ppm, N$\underline{CH_2}$CH$_2$CH$_2$CH$_2$ (2×); 52.2 ppm, N$\underline{CH_2}$CH$_2$CH$_2$N (8×); 51.8 ppm, N$\underline{CH_2}$CH$_2$CH$_2$NH$_2$ (8×); 40.6 ppm $\underline{CH_2}$NH$_2$ (8×); 30.8 ppm, $\underline{CH_2}$CH$_2$NH$_2$ (8×); 25.0 ppm, NCH$_2$$\underline{CH_2}$CH$_2$CH$_2$N (2×); 24.5 ppm, NCH$_2$$\underline{CH_2}$CH$_2$N (4×).

Example XXXVI

Example XXXII was repeated but now 17.71 g of DAB(PA)$_4$(PA)$_8$ were used as substrate instead of DAB(PA)$_4$. To this mixture, 41.34 g of ACN were added in one shot. The reaction mixture thus obtained was heated at 80° C. for 3 hours.

The isolated product was analyzed by means of $^{13}$C NMR spectroscopy, which revealed that the product obtained was DAB(PA)$_4$(PA)$_8$(ACN)$_{16}$.

$^{13}$C NMR (50 MHz, CDCl$_3$): 119.0 ppm, CN (16×); 54.2 ppm, N$\underline{CH_2}$CH$_2$CH$_2$CH$_2$ (2×); 54.2 ppm, N$\underline{CH_2}$CH$_2$CH$_2$ (8×); 51.6 and 51.4 ppm, N$\underline{CH_2}$CH$_2$CH$_2$ (16×); 49.5 ppm, NCH$_2$CH$_2$CN (16×); 24.92 and 24.9 ppm NCH$_2$$\underline{CH_2}$CH$_2$CH$_2$ and NCH$_2$$\underline{CH_2}$CH$_2$N (10×); 24.5 ppm, NCH$_2$$\underline{CH_2}$CH$_2$N (4×); 16.9 ppm, $\underline{CH_2}$CN (16×).

Example XXXVII

Example XXXIII was repeated, 20.86 g of DAB(PA)$_4$(PA)$_8$(ACN)$_{16}$ (containing 18.3 wt. % of water) being reduced at 80° C. for 240 minutes in the presence of 17.63 g of Raney cobalt catalyst (wet), 54.1 g of methanol and 27.3 g of ammonia. About 51.8% catalyst (dry) relative to DAB(PA)$_4$(PA)$_8$(ACN)$_{16}$ was added. Ammonia was added in a molar ratio of 152.6 relative to DAB(PA)$_4$(PA)$_8$(ACN)$_{16}$. The isolated product was analyzed by means of $^{13}$C NMR spectroscopy, which revealed that the product obtained was DAB(PA)$_4$(PA)$_8$(PA)$_{16}$.

$^{13}$C NMR (50 MHz, CDCl$_3$): 54.3 ppm, N$\underline{CH_2}$CH$_2$CH$_2$CH$_2$ (2×); 52.3 ppm, N$\underline{CH_2}$CH$_2$CH$_2$N (24×); 51.8 ppm, N$\underline{CH_2}$CH$_2$CH$_2$NH$_2$ (16×); 40.6 ppm, $\underline{CH_2}$NH$_2$ (16×); 30.8 ppm, $\underline{CH_2}$CH$_2$NH$_2$ (16×); 25.0 ppm, NCH$_2$$\underline{CH_2}$CH$_2$CH$_2$N (2×); 24.5 ppm, NCH$_2$$\underline{CH_2}$CH$_2$N (12×).

Example XXXVIII

Example XXXII was repeated, but now 38.7 g of DAB(PA)$_4$(PA)$_8$(PA)$_{16}$ were used as substrate instead of DAB(PA)$_4$. To this mixture, 83 g of ACN were added in one shot. The reaction mixture thus obtained was heated at 80° C. for 4 hours.

The isolated product was analyzed by means of $^{13}$C NMR spectroscopy, which revealed that the product obtained was DAB(PA)$_4$(PA)$_8$(PA)$_{16}$(ACN)$_{32}$.

$^{13}$C NMR (50 MHz, CDCl$_3$): 119.0 ppm, CN (32×); 52.2 ppm, N$\underline{CH_2}$CH$_2$CH$_2$CH$_2$ (2×); 51.6 ppm, N$\underline{CH_2}$CH$_2$CH$_2$ (24×); 51.4 ppm, N$\underline{CH_2}$CH$_2$CH$_2$ (32×); 49.5 ppm, NCH$_2$CH$_2$CN (32×); 25.0 ppm NCH$_2$$\underline{CH_2}$CH$_2$CH$_2$ and NCH$_2$$\underline{CH_2}$CH$_2$N (18×); 24.3 ppm, NCH$_2$$\underline{CH_2}$CH$_2$N (12×); 16.9 ppm, $\underline{CH_2}$CN (32×).

Example XXXIX

Example XXXIII was repeated, 14.2 g of DAB(PA)$_4$(PA)$_8$(PA)$_{16}$(ACN)$_{32}$ (containing 14.1 wt. % of water) being reduced at 80° C. for 360 minutes in the presence of 11.39 g of Raney cobalt catalyst (wet), 34.9 g of ammonia and 1.03 g of water. About 46.9% catalyst (dry) relative to DAB(PA)$_4$(PA)$_8$(PA)$_{16}$(ACN)$_{32}$ was added. Ammonia was added in a molar ratio of 568.9 relative to DAB(PA)$_4$(PA)$_8$(PA)$_{16}$(ACN)$_{32}$. The isolated product was analyzed by means of $^{13}$C NMR spectroscopy, which revealed that the product obtained was DAB(PA)$_4$(PA)$_8$(PA)$_{16}$(PA)$_{32}$.

$^{13}$C NMR (50 MHz, CDCl$_3$): 52.4 and 52.2 ppm, N$\underline{CH_2}$CH$_2$$\underline{CH_2}$N (56×); 51.9 ppm, N$\underline{CH_2}$CH$_2$CH$_2$NH$_2$ (32×); 40.7 ppm, $\underline{CH_2}$NH$_2$ (32×); 30.9 ppm, $\underline{CH_2}$CH$_2$NH$_2$ (32×); 24.5 ppm, NCH$_2$$\underline{CH_2}$CH$_2$N (28×).

Example XL

Regenerated Catalyst

Example XXXIII was repeated, but instead of fresh catalyst, the same quantity of catalyst regenerated with NaOH was used. About 24 g of Raney cobalt which had been used one time in the hydrogenation of a cyanide-terminated product was suspended in a three-neck flask containing 175 ml of a 5% NaOH solution. After stirring for 2 hours at 60° C. and subsequent cooling to room temperature, the catalyst was filtered off and washed with deionized water until the pH of the washing water was about 7. Next, the regenerated catalyst was used in the hydrogenation of DAB(ACN)$_4$ as described in Example XXXIII. Full conversion was achieved.

Example XLI

According to a preferred embodiment, one reactive site of each amine-group of an amine terminated dendrimer is allowed to react with a vinyl-cyanide unit (V). The remaining reactive site is then allowed to react with a second vinyl-cyanide unit (W), whereby V differs from W. For example, an amine terminated dendrimer (e.g., of generation 1.5, is allowed to first react with fumaryl dinitrile, and thereafter to react with acrylonitrile.

1 equivalent of 4 -cascade:1,4-diaminobutane:butylamine (DAB(BA)$_4$) was dissolved in a ten fold excess of tetrahydrofuran, to which a catalytically effective amount of water was added. 4.4 equivalents of fumaryl dinitrile (FCN$_2$) were dissolved in a 30-fold excess of tetrahydrofuran and added to the DAB(BA)$_4$ solution via a dropping funnel, while stirring. The mixture was cooled in an ice bath. A stream of N$_2$-gas was passed over the reaction mixture. After all the fumaryl dinitrile was added, stirring was continued for 1 hour. Then, the tetrahydrofuran was evaporated. The conversion of DAB(BA)$_4$ to DAB(BA)$_4$(FCN$_2$)(ACN)$_4$ was approximately 90%.

The Examples demonstrate that different generations of dendritic macromolecules according to the invention can be synthesized. The synthesized dendritic macromolecules according to the present invention are not sensitive to degradation through hydrolysis reactions. These syntheses can be carried out in various solvents, in the presence of different catalysts, and at different reaction conditions. In the present processes for preparing the dendritic macromolecules, the various reaction steps can be carried out one after the other without having to isolate the (intermediate) product obtained after each individual step. The present processes are easily scaled up to permit commercial scale, i.e. large scale, production of the dendritic macromolecules according to the present invention. The available functionalities of the dendritic macromolecules according to the present invention can be modified by reaction with a suitable other functional moiety. For instance, in a multi-generation dendritic macromolecule according to the present invention, the outermost generation can be modified with other functional groups. The dendritic macromolecules according to the present invention exhibit very good thermal stability.

What we claimed is:

1. A thermally stable dendritic macromolecule which is insensitive to degradation through hydrolysis, said dentritic macromolecule comprising:

a core; and branches emanating from the core, wherein the branches are made from vinyl-cyanide units, wherein the branches emanate from said core for N number of generations wherein $3 \leq N \leq 10$ and the dendritic macromolecule has a molecular weight of at least 1600.

2. A dendritic macromolecule according to claim 1, wherein the core is formed from a molecule containing 1 to 10 functional groups, and each functional group, independently of one another, has a functionality of 1, 2 or 3.

3. A dendritic macromolecule according to claim 2, wherein the core is formed from a (co)polymer containing at least one functional group having a functionality of 1, 2 or 3.

4. A dendritic macromolecule according to claim 2, wherein the core is formed from a compound or (co)polymer having at least one functional group selected from the group consisting of a hydroxyl group, a primary amine group and a secondary amine group.

5. A dendritic macromolecule according to claim 1, wherein the core is selected from the group consisting of polymethylene diamines, glycols and tris(1,3,5-aminoethyl)benzene.

6. A dendritic macromolecule according to claim 1, wherein the core has more than one reactive site R, and the number of functional groups in a N generation is greater than the number of reactive sites R and less than or equal to the number of reactive sites R multiplied by $2^{N-1}$.

7. A dendritic macromolecule according to claim 1, wherein the vinyl-cyanide unit is acrylonitrile or methacrylonitrile.

8. A dendritic macromolecule according to claim 1, wherein said branches contain units according to the formula $$R^1-(\underset{H}{\underset{|}{C}}-\underset{H}{\underset{|}{C}}-R^3)$$

wherein

R represents H or —C≡N;

$R^1$ represents the core or a unit of the previous generation;

$R^2$ represents —H or —CH$_3$;

$R^3$ represents $R^5$ represents H or a unit of the next generation;

$R^6$ represents H or a unit of the next generation, wherein $R^5$ and $R^6$ in every group may be the same or different from one another.

9. A dendritic macromolecule according to claim 1, wherein the dendritic molecule is modified, in whole or in part, with at least one functional group.

10. A dendritic macromolecule according to claim 9, wherein the functional group for effecting the modification is selected from the group consisting of unsaturated aliphatic ester, unsaturated aliphatic amide, acid halide, alkyl halide, aryl halide, tosyl halide, anhydride, dicarboxylic acid and (a)cyclic aldehyde.

11. A dendritic macromolecule according to claim 1, wherein said macromolecule is substantially spherical.

12. A thermally stable dendritic macromolecule which is insensitive to degradation through hydrolysis, said dentritic macromolecule comprising:

a core; and branches emanating from the core, wherein the branches are made from vinyl-cyanide units, wherein either the branches emanate from said core for N number of generations wherein $3 \leq N \leq 10$ or the dendritic macromolecule has a molecular weight of at least 1600, said dendritic macromolecule being prepared by a process comprising the steps of:

a) providing a core having at least one functional group;

b) causing at least 95% of said functional groups to react with monomeric vinyl-cyanide units to obtain a reaction product containing one or more nitrile groups, in the presence of a metal-containing catalyst, wherein the metal component thereof is a metal selected from the group consisting of nickel cobalt, platinum, palladium and rhodium;

c) reducing at least 95% of the incorporated nitrile groups to amine groups;

d) reacting at least 95% of the amine groups with monomeric vinyl-cyanide units;

wherein steps c) and d) are reiteratively and alternatively conducted to obtain either a dendritic macromolecule having a molecular weight of at least 1600, or a dendritic macromolecule having branches emanating from the core for N number of generations wherein $3 \leq N \leq 10$ and a generation is obtained each time steps c) and d) are reiteratively and alternatively conducted.

13. A dendritic macromolecule according to claim 12, wherein said catalyst comprises Raney nickel or Raney cobalt.

14. A dendritic macromolecule according to claim 12, wherein said dendritic macromolecule is an amine terminated dendritic macromolecule obtained by stopping said process after a step c).

* * * * *